July 24, 1951 J. J. WHARAM ET AL 2,561,548
TORSION SPRING SUSPENSION
Filed Jan. 24, 1946 4 Sheets-Sheet 1

J. J. WHARAM.
J. J. FELTS
INVENTORS.
C. C. McRae
R. G. Harris
J. R. Faulkner.
T. H. Oster.
BY
ATTORNEYS J. J. WHARAM
J. J. FELTS
C. C. McRae
R. G. Harris
J. R. Faulkner
T. H. Oster
INVENTORS.

BY

ATTORNEYS.

J. J. WHARAM.
J. J. FELTS.
INVENTORS.

BY C. C. McRae
R. D. Harris
J. R. Faulkner
T. H. Oster
ATTORNEYS.

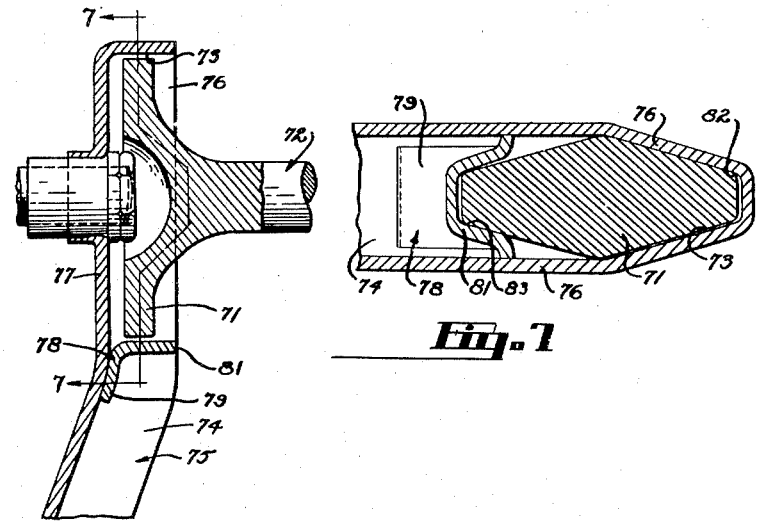
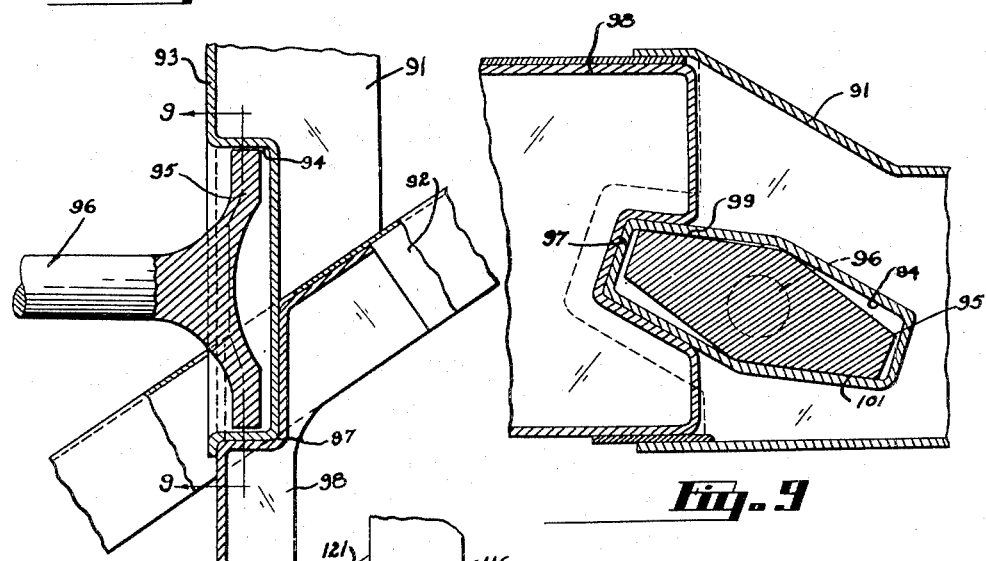
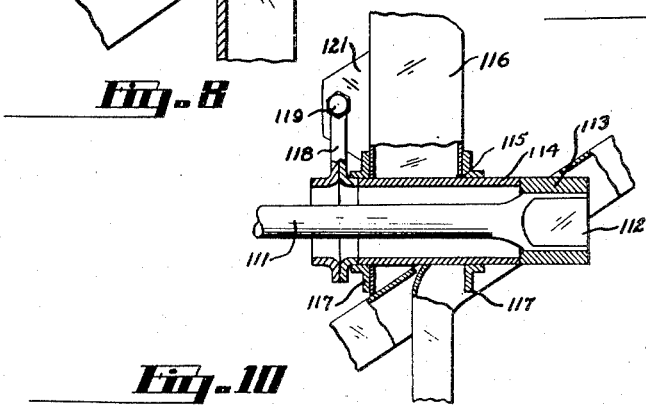

Patented July 24, 1951

2,561,548

UNITED STATES PATENT OFFICE 2,561,548

TORSION SPRING SUSPENSION

John J. Wharam, Dearborn, and Jerome J. Felts, West Bloomfield Township, Wayne County, Mich., assignors to Ford Motor Company, Dearborn, Mich., a corporation of Delaware Application January 24, 1946, Serial No. 643,104

8 Claims. (Cl. 267—57)

This invention relates generally to a vehicle suspension; and more particularly to a vehicle suspension of the torsion spring type.

Torsion springs in the form of bars or rods have heretofore been used as the means for resiliently suspending the wheels of motor vehicles. A common type utilizes longitudinally extending torsion springs in connection with vehicles having an independent front wheel suspension of the type in which each wheel carrier is supported by a pair of vertically spaced suspension levers having their inner ends pivotally connected to the vehicle frame; with the opposite ends of the torsion springs being connected to the frame and to the lower levers, respectively. The use of splines or keys as the connecting means between a torsion spring and a frame member or a suspension lever requires expensive machining operations in which close tolerances must be held. This construction also makes it difficult to provide proper means for adjusting the riding height of the vehicle. In order to place the spring in pure torsional stress, it is desirable to attach the spring to the suspension lever in axial alignment with the pivotal mounting of the lever. The construction of the pivotal mounting for the lever, and the necessity of providing adequate lubrication therefor, have complicated previous constructions in which the torsion spring either formed the pivotal mounting for the suspension lever or was attached thereto in axial alignment.

It is accordingly an object of the present invention to provide an improved suspension of the torsion spring type in which the torsion spring is arranged in axial alignment with the pivotal axis of the suspension lever and in which novel means are utilized to connect the torsion spring to the lever at this point. In a preferred form of the invention, the forward end of the torsion spring is upset to form an integral elongated enlargement or flange having end portions extending a substantial distance on oppostie sides of the body portion of the torsion spring. The elongated flange on the torsion spring is secured to the suspension lever by a pair of bolts to provide spaced points of bearing engagement between the spring and lever on opposite sides of the pivotal axis of the lever. The forward end of the torsion spring is formed with a central cavity providing clearance for the pivotal mounting of the lever and also forming a lubrication chamber.

Another object of the invention is to provide a torsion spring suspension in which one end of the torsion spring is formed with an integral elongated enlargement or flange adapted to be received within a socket formed on the suspension lever or the frame member to which the torsion spring is to be connected. The socket may be formed to embrace both ends of the enlarged flange on the torsion spring to provide a pair of spaced points of bearing engagement on opposite sides of the axis of the torsion spring, or it may embrace one end only with the opposite end of the flange being supported by a separate bracket attached to the lever or to the frame, as the case may be. In place of a bracket supporting one end of the enlarged flange in fixed relation, an adjustable abutment can be provided extending into the socket and engageable with the flange of the torsion spring to permit angular adjustment of the latter to vary the riding height of the vehicle.

Other forms of the invention are contemplated, and other objects and advantages will be made more apparent as this description proceeds, particularly when considered in connection with the accompanying drawings, in which:

Figure 6 is a fragmentary plan view of a vehicle suspension illustrating a modification.

Figure 7 is a transverse cross-sectional view taken substantially on the line 7—7 of Figure 6.

Figure 8 is a fragmentary plan view of another modification.

Figure 9 is a cross-sectional view taken substantially on the line 9—9 of Figure 8.

Figure 10 is a fragmentary horizontal cross-sectional view of another modification.

Figure 1:
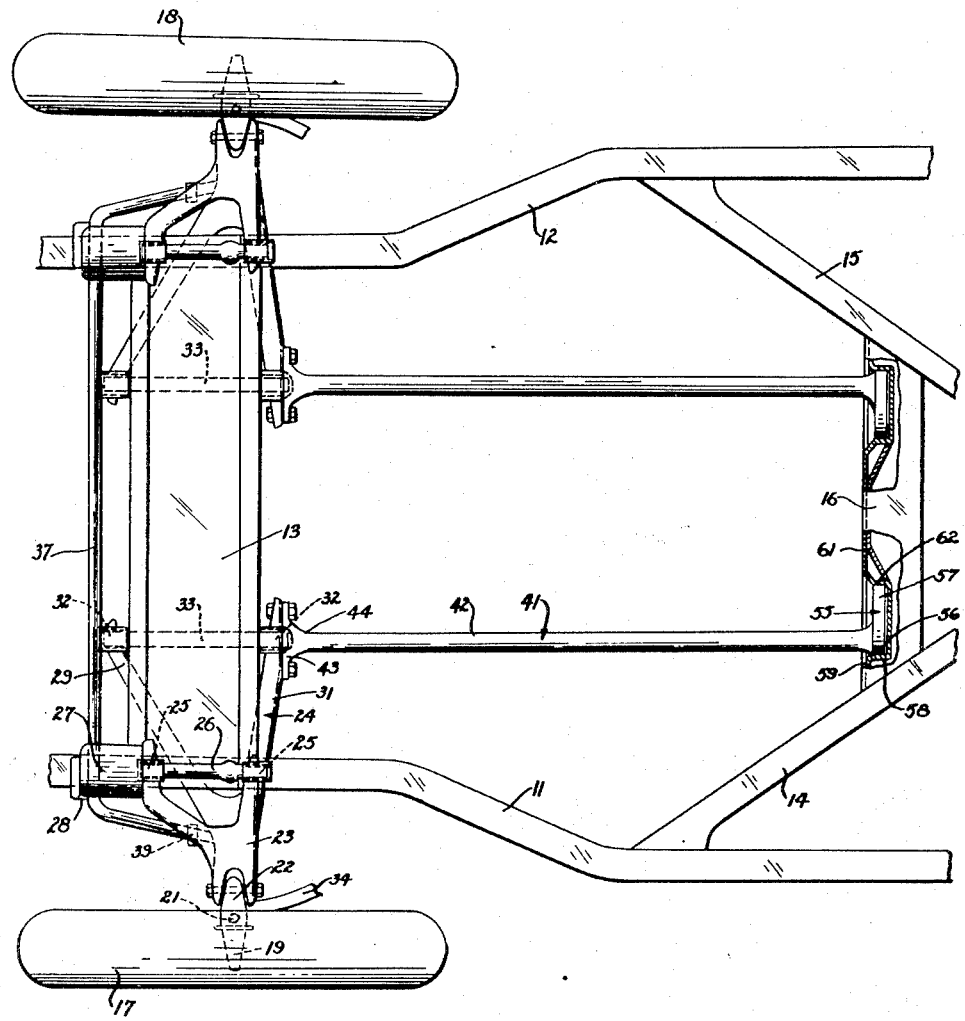
Figure 1 is a plan view of the front portion of a motor vehicle chassis provided with an independent torsion spring suspension for the front wheels in accordance with the present invention.
Figure 2:
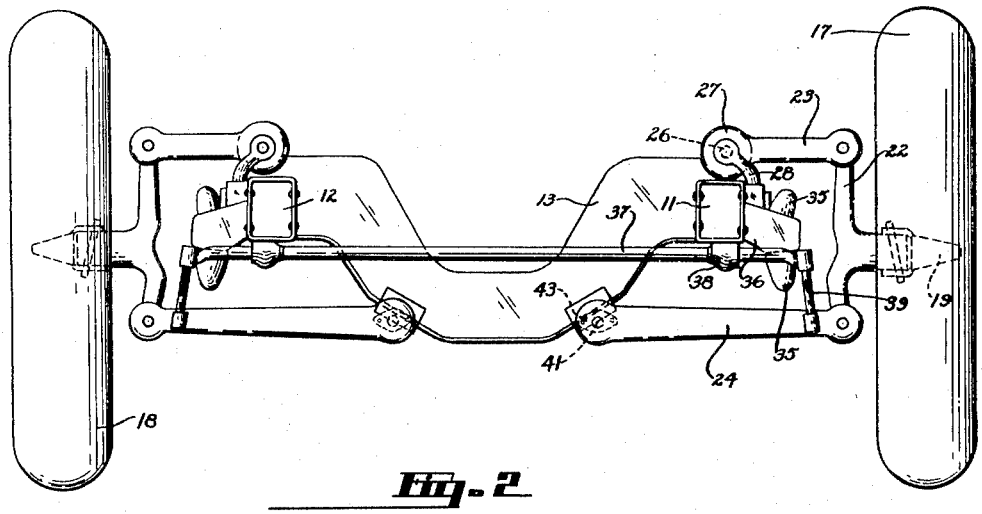
Figure 2 is a front end elevation of the vehicle shown in Figure 1.

Referring now to the drawings, and particularly to the embodiment of the invention shown in Figures 1 to 5 inclusive, the reference characters 11 and 12 indicate the side members of a vehicle frame having a front cross member 13, X-frame members 14 and 15, and an intermediate transverse frame member 16. Each of the front wheels 17 and 18 is connected to the frame by an independent suspension system of the torsion spring type, and, inasmuch as the suspension system for each wheel is identical, only that for the left front wheel 17 will be described in detail.

The left front wheel 17 is mounted upon a spindle 19, the latter being connected by a kingpin 21 to a wheel supporting member 22. The wheel supporting member is pivotally connected to the outer end of a pair of vertically spaced transversely extending suspension levers 23 and 24 which are of a V or "wishbone" shape.

The inboard end of the upper suspension lever 23 carries threaded bushings 25 which pivotally receive the opposite threaded ends of a shaft 26 mounted upon the front cross frame member 13. The body 27 of a shock absorber of the conventional type is bolted to the forward furcation of the lever 23 in axial alignment with the shaft 26. The actuating lever 28 of the shock absorber is bolted to the side frame member 11. The body of the shock absorber thus rotates with the upper suspension lever, and since the actuating lever 28 is fixed, provides the necessary shock absorbing action.

The inwardly extending furcations or arms 29 and 31 of the lower suspension lever 24 similarly carry threaded bushings 32 adjacent their inboard ends. The threaded bushings pivotally receive the opposite threaded ends of a shaft 33 mounted upon the front cross frame member 13. With the outer ends of the upper and lower levers 23 and 24 pivotally connected to the upper and lower portions, respectively, of the wheel supporting member 22, it will be seen that the front wheel 17 is independently mounted upon the frame, and is movable, generally, in a vertical plane.

Suitable linkage of the conventional type, shown partially at 34, enables the front wheels to be pivoted about the king pin 21 for steering. Pivotal movement of the upper and lower suspension levers 23 and 24 is limited by resilient stops 35 carried by a bracket 36 mounted upon the side frame member 11. A transversely extending sway bar 37 of the conventional type is pivotally mounted in bushings 38 carried by the side frame members 11 and 12. Opposite ends of the sway bar are cranked rearwardly, and connected by links 39 to the lower suspension lever 24.

Figure 3:
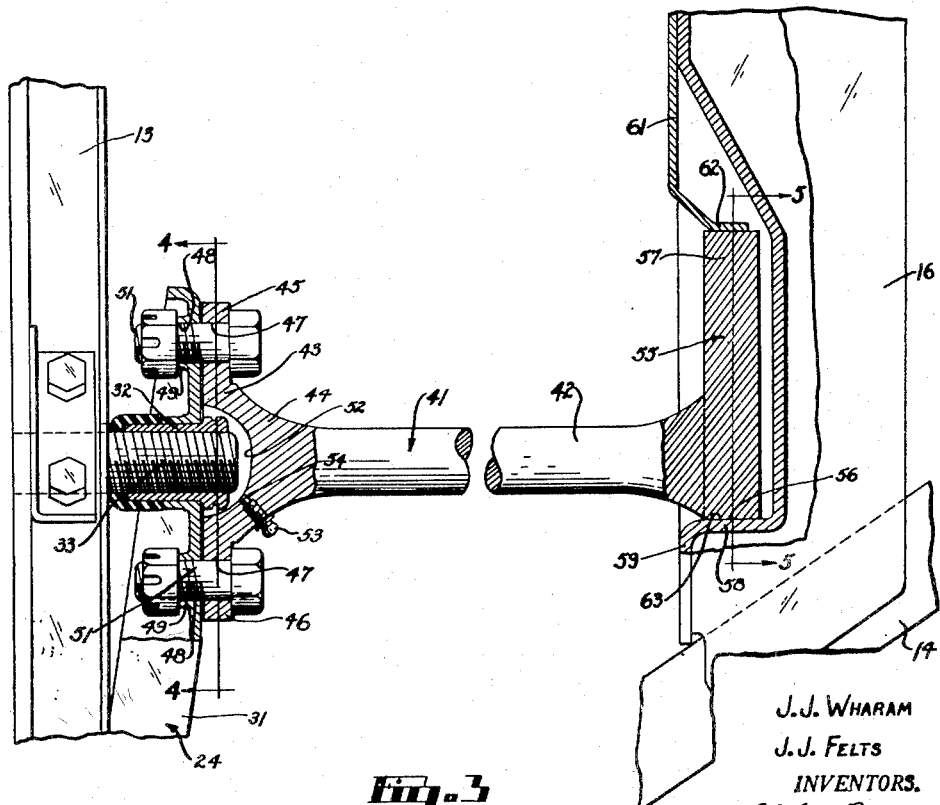
Figure 3 is an enlarged fragmentary plan view, partially in section, of a portion of Figure 1, illustrating particularly the construction of the opposite ends of the torsion spring and the attachment thereof to the suspension lever and to the frame.
Figure 4:
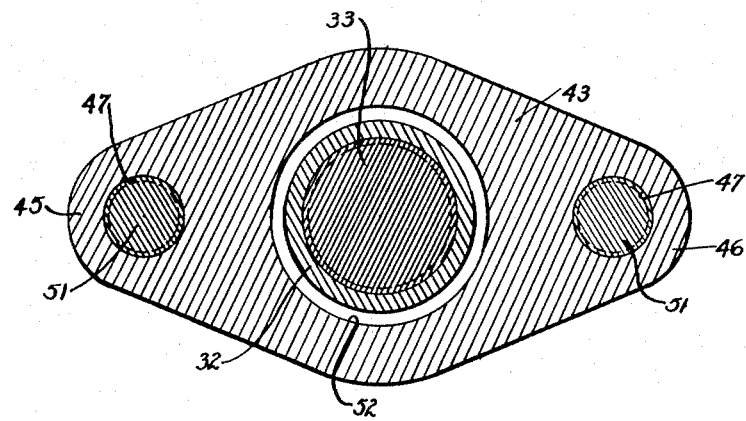
Figure 4 is a transverse cross-sectional view taken substantially on the line 4—4 of Figure 3.

A longitudinally extending torsion spring 41, in the form of a bar or rod, extends between the lower lever 24 and the intermediate transverse frame member 16, and is arranged to resiliently restrain swinging movement of the front wheel suspension in an upward direction relative to the vehicle frame. As best seen in Figures 1 and 3, the torsion spring 41 has a straight body portion 42 arranged in axial alignment with the axis of the shaft 33 pivotally supporting the lower lever 24. The forward end of the torsion spring 41 is upset to form an integral elongated enlargement or flange 43 extending substantially at right angles to the body portion 42. The flange 43 is joined to the straight body portion of the torsion spring by an integral portion 44 of tapering cross section. As will be apparent from an examination of Figures 3 and 4, this elongated flange 43 at the forward end of the torsion spring provides a pair of integral ears 45 and 46 extending a substantial distance on opposite sides of the body portion of the torsion spring.

The forward face of the elongated flange 43 of the torsion spring abuts the base flange of the rearward arm 31 of the lower suspension lever 24. Apertures 47 are formed in the ears 45 and 46 of the elongated flange in alignment with apertures 48 of corresponding size formed in the base flange of the lever arm 31. Integral sleeves 49 formed in lever arm 31 at the apertures 48 provide extended bearing areas for bolts 51 which extend through the aligned apertures 47 and 48 and secure the torsion spring flange to the lever.

An axial cavity 52 is provided in the forward face of the elongated flange 43 of the torsion spring. The cavity not only provides clearance for the extending portion of the threaded bushing 32 and the shaft 33, but in addition forms a chamber for lubricant for the threaded bushing and shaft. Lubricant is introduced into the cavity 52 by means of a fitting 53 and a passage 54.

From the foregoing it will be apparent that the present construction provides an inexpensively manufactured torsion spring which may readily be attached to an independent front wheel suspension of the conventional type with a minimum of changes therein. The torsion spring is arranged co-axially with the axis of one of the suspension levers and has a pair of spaced points of bearing engagement with the lever, through the bolts 51. Inasmuch as the bolts 51 are spaced a substantial distance apart, and at equal distances on opposite sides of the axis of the shaft 33 for the suspension lever, a force couple is formed of such character that stresses in the torsion spring and the suspension lever are minimized. Although co-axial with the pivotal mounting for the lever, the torsion spring does not interfere with the construction of the mounting, nor with the lubrication thereof, but in fact simplifies and improves the lubrication of the threaded bushing and shaft by providing a lubricant chamber within the end of the torsion spring.

Figure 5:
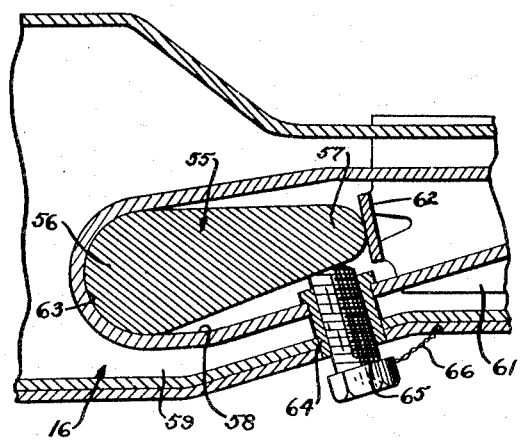
Figure 5 is a transverse cross-sectional view taken substantially on the line 5—5 of Figure 3.

Referring now to the rearward portion of the torsion spring 41, as best shown in Figures 3 and 5, the rearward end of the spring is upset to form an integral flange 55. One end of the flange 55 is formed with a semi-cylindrical portion 56 concentric with the axis of the torsion spring. The opposite end of the flange forms a lever arm 57 extending a substantial distance outwardly from the torsion spring.

The elongated flange 55 is received within a socket 58 formed in the intermediate transverse frame member 16 by depressing the forward flange 59 thereof. It will be noted that, although the socket 58 is considerably longer than the flange 55, movement of the flange longitudinally of the socket is restrained by a bracket 61 having a flange 62 extending into the socket and abutting the outer end of the lever arm 57 of the flange 55.

The end of the socket 58 opposite the bracket 61 is formed with a semi-cylindrical surface 63 engaging the corresponding semi-cylindrical end 56 of the flange 55, and permitting relative angular movement therebetween. Angular movement of the flange 55 relative to the cross frame member 16 is permitted since the socket 58 is narrower than the tapered end of the lever arm 57 of the flange.

A threaded bushing 64 is carried by the transverse frame member 16, opening into the socket 58 adjacent the end of the lever arm 57. A stud 65 is received within the threaded bushing 64 and adjustably engages the lever arm. This arrangement permits an angular adjustment of the rearward end of the torsion spring to vary the riding height of the vehicle and to balance the opposite sides thereof. Although the stud will be held in its adjusted position by the pressure of the lever arm 57 against it, locking means may be provided, such as a lock wire 66.

In Figures 6 and 7 there is illustrated a modification of the invention in which the elongated flange 71 at the forward end of the torsion spring 72 is received within a socket 73 formed in the rearward arm 74 of the lower suspension lever 75. The arm 74 is channel shaped and preferably formed of sheet metal with side flanges 76 extending rearwardly from a base flange 77. It will be noted from Figure 7 that the side flanges 76 of the arm 74 converge toward each other at the outer end of the arm and conform closely to the configuration of the inboard end of the elongated flange 71 of the torsion spring. The outboard end of the elongated flange 71 is supported by a stamping 78 having a base flange 79 spotwelded to the base 77 of the suspension arm 74. A generally U-shaped flange 81 extends rearwardly at right angles from the base flange 79 and embraces the outboard end of the elongated flange of the torsion spring, as best seen in Figure 7. Opposite edges of the U-shaped flange 81 are turned outwardly and engage the side flanges 76 of the suspension arm 74, for additional support. Inasmuch as the torsion spring 72 is always under torsional load when assembled in the vehicle, diametrically opposite corners 82 and 83 of the elongated flange are held in bearing engagement with a side flange 76 and the U-shaped flange 81, respectively.

One advantage of the construction shown in Figures 6 and 7 resides in the simplicity of manufacture and the ease of assembly. In addition, the flange and socket arrangement compensates for manufacturing variations since a limited axial movement of the elongated flange 71 of the torsion spring is permitted in the socket 73 without affecting the connection therebetween.

The modification illustrated in Figures 8 and 9 discloses a similar flange and socket arrangement particularly adapted for anchoring the rearward end of a torsion spring upon a cross frame member. The reference character 91 indicates a transverse frame member merging into and secured to an X-frame member 92. The forward vertical flange 93 of the transverse frame member 91 is depressed to form a socket 94, adapted to receive the elongated flange 95 formed upon the rearward end of the torsion spring 96 by upsetting the end of the latter. The outboard end of the socket 94 telescopes within a socket 97 formed in the end wall of a second transverse frame member 98 extending between the X-frame member 92 and the side frame member (not shown). Referring to Figure 9, it will be seen that the torsional load on the torsion spring is such as to place the diametrically opposed sides 99 and 101 in bearing engagement with the adjacent sides of the socket 94.

The modification shown in Figure 10 illustrates another construction for adjustably anchoring the rearward end of a torsion spring to a transverse frame member. The torsion spring 111 is formed with an enlarged rearward end portion 112 which is square in cross section and which is non-rotatably received within a socket formed in a sleeve 113. The sleeve 113 is welded to a sleeve 114 which extends through an aperture 115 formed in the transverse cross frame member 116. Flanged bushings 117 are secured to the frame member on opposite sides thereof and rotatably support the sleeve 114. A lever arm 118, formed of a pair of stampings, is welded to the forward end of the sleeve 114 and carries at its outer end an adjusting screw 119. The adjusting screw engages a bracket 121 welded to the transverse frame member 116, and may be adjusted to vary the angular position of the rearward end of the torsion spring relative to the frame to adjust the riding height of the vehicle as desired.

It will be understood that the invention is not to be limited to the exact construction shown and described, but that various changes and modifications may be made without departing from the spirit and scope of the invention, as defined in the appended claims.

What is claimed is:

1. An independent suspension for a vehicle comprising a frame, a road wheel, a wheel carrier supporting said road wheel, a pair of vertically spaced arms pivotally connected at opposite ends to said wheel carrier and to said frame respectively for independently mounting said road wheel on said frame, a cross member on said frame rearwardly of said arms, a torsion spring extending longitudinally of said vehicle between one of said arms and said cross frame member, the forward end of said torsion spring being in axial alignment with the pivotal axis between said last-mentioned arm and said frame and having an integral enlargement extending a substantial distance on opposite sides of the body portion of said torsion spring, means mounting said enlargement on said last-mentioned arm adjacent said pivotal axis, a lever on the rearward end of said torsion spring, and said cross member having a socket receiving said lever and restraining angular movement of said lever and the rearward end of said torsion spring.

2. An independent suspension for a vehicle comprising a frame, a cross member on said frame, a road wheel, a wheel carrier supporting said road wheel, a pair of vertically spaced levers pivotally connected at opposite ends to said wheel carrier and to said frame respectively for independently mounting said wheel on said frame, a torsion spring extending generally longitudinally of said vehicle and formed with an integral lever at its rearward end, a socket in said cross member, said socket receiving and anchoring said lever and being slightly larger than said lever to permit a limited angular adjustment, the forward end of said torsion spring having an integral flange extending at right angles therefrom, and means connecting said flange to said levers adjacent the pivotal axis between said last-mentioned lever and said frame, the forward end of said torsion spring being provided with an axial cavity providing clearance adjacent said pivotal axis.

3. The structure of claim 1 which is further characterized in that the means for mounting said enlargement on said last-mentioned arm includes a pair of bolts extending through aligned apertures in said torsion spring flange and said last-mentioned arm, integral sleeves being formed in said arm adjacent said apertures to provide extended bearing engagements for said bolts.

4. In a vehicle having a frame and a road wheel, a longitudinally extending shaft mounted on said frame, a bifurcated suspension lever carrying said road wheel at its outboard end and having the inboard ends of its furcations pivotally mounted on said shaft, a longitudinally extending torsion spring arranged in axial alignment with said shaft and anchored at its rearward end on said frame, said torsion spring having an integral elongated enlargement formed on its forward end and extending a substantial distance on opposite sides of the axis of said shaft, and the rearward furcation of said suspension lever having a socket formed therein for receiving said elongated enlargement and providing spaced points of bearing engagement between said enlargement and said lever.

5. The structure of claim 4 which is further characterized in that the socket formed in the suspension lever embraces the inboard end of the elongated enlargement at the forward end of the torsion spring, and a separate bracket mounted on said suspension lever and adapted to embrace the outboard end of said elongated enlargement to support the latter.

6. In a vehicle having a frame and a road wheel, a supporting member carrying said road wheel and pivotally mounted on said frame, a torsion spring extending longitudinally of said vehicle and anchored at its forward end to said supporting member, an intermediate frame member on said vehicle, the rearward end of said torsion spring being upset to form an integral elongated enlargement extending radially of said spring, said intermediate frame member being provided with a transversely extending elongated socket adapted to receive the elongated enlargement at the rearward end of said torsion spring and to provide spaced points of bearing engagement therewith.

7. In a vehicle having a frame and a road wheel, a supporting member carrying said road wheel and pivotally mounted on said frame, a torsion spring extending longitudinally of said vehicle and connected at its forward end to said supporting member, said torsion spring being provided at its rearward end with a flange having an arcuate portion concentric with the axis of said torsion spring and an elongated lever arm extending in one direction from said torsion spring, a cross frame member provided with an elongated socket receiving said flange, one end of said socket being arcuate to engage the concentric arcuate portion of the flange and the opposite end of said socket being somewhat wider than the lever arm to permit limited angular movement of the lever arm within said socket, and an adjustable abutment carried by said X-frame member and extending into said socket and adjustably engaging said lever arm at a point spaced from the axis of said torsion spring.

8. An independent suspension for a vehicle comprising a frame, front and intermediate cross members on said frame, a road wheel, a wheel carrier supporting said road wheel, a pair of vertically spaced bifurcated levers pivotally connected at their outer ends to said wheel carrier, a longitudinally extending shaft mounted on said front cross member and having threaded end portions, threaded bushings carried at the inboard end of the furcations of one of said levers and engageable with the threaded ends of said shaft, a torsion spring arranged in axial alignment with said shaft and anchored at its rearward end on said intermediate cross member, the forward end of said torsion spring being upset to form an enlarged integral flange extending at right angles thereto, means for transmitting force between the opposite end portions of said flange and said last-mentioned lever at equal distances on opposite sides of the axis of said shaft to provide a resilient suspension for said road wheel, the forward end of said torsion spring being formed with an axial cavity providing clearance for the rearward end of said shaft and one of said threaded bushings, said torsion spring having a lubrication passage extending therethrough and communicating with said cavity to provide for the lubrication of said shaft and bushing.

JOHN J. WHARAM.
JEROME J. FELTS.

REFERENCES CITED

The following references are of record in the file of this patent:

UNITED STATES PATENTS

| Number | Name | Date |
|---|---|---|
| 493,677 | Bonnar | Mar. 21, 1893 |
| 1,583,291 | Hawley | May 4, 1926 |
| 2,060,015 | Barnes et al. | Nov. 10, 1936 |
| 2,083,085 | Palmer | June 8, 1937 |
| 2,080,969 | Macbeth | May 18, 1937 |
| 2,103,590 | Lefevre | Dec. 28, 1937 |
| 2,173,974 | Leighton | Sept. 26, 1939 |
| 2,210,241 | Hickman | Aug. 6, 1940 |
| 2,299,935 | Slack et al. | Oct. 27, 1942 |
| 2,344,983 | Fageol | Mar. 28, 1944 |

FOREIGN PATENTS

| Number | Country | Date |
|---|---|---|
| 767,598 | France | May 1, 1934 |
| 446,985 | Great Britain | May 11, 1936 |